US009574598B1

(12) United States Patent
Carmichael et al.

(10) Patent No.: US 9,574,598 B1
(45) Date of Patent: Feb. 21, 2017

(54) SPLIT NUT FOR SCREW CONNECTION

(71) Applicant: Allfasteners USA, LLC, Medina, OH (US)

(72) Inventors: Bruce A. Carmichael, Bay Village, OH (US); Paul D. Doherty, Orwell, OH (US); Michael Strange, Brook Park, OH (US)

(73) Assignee: Allfasteners USA, LLC, Medina, OH (US)

( * ) Notice: Subject to any disclaimer, the term of this patent is extended or adjusted under 35 U.S.C. 154(b) by 0 days.

(21) Appl. No.: 14/730,683

(22) Filed: Jun. 4, 2015

Related U.S. Application Data

(60) Provisional application No. 62/008,214, filed on Jun. 5, 2014.

(51) Int. Cl.
F16B 37/08 (2006.01)
B23P 19/06 (2006.01)

(52) U.S. Cl.
CPC ............ *F16B 37/0892* (2013.01); *B23P 19/06* (2013.01)

(58) Field of Classification Search
CPC ... F16B 37/0885; F16B 37/0892; F16B 37/08; B23P 19/06
USPC .......................................... 411/432, 433, 436
See application file for complete search history.

(56) References Cited

U.S. PATENT DOCUMENTS

| | | | | |
|---|---|---|---|---|
| 1,305,009 A * | 5/1919 | Robertson | ............. | F16L 19/005 285/219 |
| 1,510,492 A * | 10/1924 | Caron | ................. | F16B 37/0885 137/231 |
| 2,377,581 A * | 6/1945 | Shaffrey | ............. | F16B 37/0892 411/433 |
| 2,631,209 A * | 3/1953 | Fortney | .................. | H01R 11/14 285/393 |
| 2,735,489 A * | 2/1956 | Fowler | ................. | B21D 28/343 30/360 |
| 2,931,009 A * | 3/1960 | Dutton | ..................... | H01R 4/56 403/184 |
| 3,868,193 A | 2/1975 | Schott | | |
| 4,033,394 A | 7/1977 | Capuano | | |

(Continued)

OTHER PUBLICATIONS

Whittet-Higgins, SNS Clampnut, http://www.whittet-higgins.com, Accessed Jun. 4, 2014.

*Primary Examiner* — Roberta Delisle
(74) *Attorney, Agent, or Firm* — Luedeka Neely Group, P.C.

(57) ABSTRACT

A split nut and assembly steps for fitting the nut around an exposed portion of anchor bolt having no convenient access for conventional nuts to engage. The split nut includes first and second nut halves, and each nut half has an interior surface having a threaded half cylinder that, when aligned with the other threaded half cylinder and joined along joining surfaces, forms a threaded opening. The two half nuts may be connected by connectors that are inserted into penetrations that extend through at least a portion of both half nuts. At least one end of the penetration extends from the joining surface through the exterior surface of the half nut so that the connector may be inserted into the penetration. The exterior surface of both half nuts also include flat that, when the half nuts are joined, are dimensioned to form opposed parallel drive surfaces configured to be engaged by a wrench for screwing the split nut onto the bolt.

11 Claims, 9 Drawing Sheets

(56) References Cited

U.S. PATENT DOCUMENTS

| | | | | |
|---|---|---|---|---|
| 4,574,881 A | * | 3/1986 | Bednarz | E21B 33/062 166/75.11 |
| 4,923,349 A | * | 5/1990 | Logsdon | F16L 19/0231 285/387 |
| 5,032,048 A | | 7/1991 | Walton et al. | |
| 6,367,849 B1 | * | 4/2002 | Tatsuta | F16L 21/06 285/367 |
| 6,799,930 B1 | * | 10/2004 | More | F16B 37/0892 411/278 |
| 8,118,528 B2 | * | 2/2012 | Herndon | F16B 37/0892 285/33 |
| 8,794,882 B2 | * | 8/2014 | Whaley | B23G 5/04 408/215 |
| 2011/0268534 A1 | | 11/2011 | Hohmann et al. | |

\* cited by examiner

SPLIT NUT FOR SCREW CONNECTION

CROSS REFERENCE TO RELATED APPLICATIONS

This application claims priority to and makes reference to U.S. provisional application 62/008,214, filed Jun. 5, 2015, entitled Split Nut For Screw Connection, invented by Bruce A. Carmichael, Paul D. Doherty, and Michael Strange, which is incorporated by reference herein as if fully and completely copied into this document.

FIELD

This invention relates to the field of mechanical hardware. More particularly, this invention relates to a specialized split nut and a method of use for adding supplemental anchor bolts to existing support structures.

BACKGROUND

Large construction structures often need to be scaled for various purposes. For example, large towers are often scaled to change or improve equipment, modify or reinforce the structure of the tower, and maintain the tower. New innovations and increased demands have created a need to add additional weight to these types of towers. Often, it is necessary or desirable to reinforce the towers to accommodate the additional weight.

Many cell towers or other similar support structures, such as light poles, structural columns, and bridge supports may be mounted on a support platform that is supported on foundation bolts that are anchored into a concrete foundation in the ground. Typically, there is a space below the support platform and above the concrete foundation that ranges in height and is typically from about 1 inch to about 4 inches in height, depending on the application. As technology has advanced, there has been an increasing demand to place additional equipment on these types of towers. For example, when upgrading a tower from 3G to 4G mobile telecommunications technology additional equipment is needed, which adds additional weight to the tower. However, since the towers were likely not originally designed to support this additional equipment, the added weight of the additional equipment might exceed the weight tolerances of the towers and make them unsafe to use. However, the cost and time of constructing new cell towers makes replacing the existing towers with newer, stronger towers impractical.

What is needed, therefore, is a method for reinforcing existing support tower that would enable those towers to safely support the weight of additional equipment.

SUMMARY

The above and other needs are met by a split nut for use in fitting around an exposed portion of a bolt where an end of the bolt is inaccessible. The split nut includes a first nut half having a threaded half cylinder formed on a first internal surface and a second nut having a threaded half cylinder formed on a second internal surface. The first and second half nuts may be joined together around a portion of the bolt so that the threaded half cylinders form an opening having a cooperative thread system that mesh with the bolt when the first and second half nuts are secured together.

The first half nut also has a first exterior surface and a plurality of flats formed on the first exterior surface. The second half nut is configured to contact the first nut half and includes a second exterior surface and a plurality of flats formed on the second exterior surface. A plurality of connectors is provided for removably connecting the first nut half to the second nut half.

The plurality of flats on the first and second nut halves are dimensioned to form opposed parallel drive surfaces when the first and second half nuts are secured together. In certain embodiments, the first and second exterior surfaces form a hexagonal outer surface when the first nut half contacts the second nut.

There may be left and right joining surfaces formed on the first interior surface, and left and right joining surfaces formed on the second interior surface that are configured to align with the joining surfaces of the first half nut. Also, left and right penetrations extending through the left and right joining surfaces of the first interior surface may be configured to align with left and right penetrations extending through the left and right joining surfaces of the second interior surface when the joining surfaces of the first and second half nuts are aligned. The left and right penetrations in at least one of the first and second interior surfaces extends through the corresponding exterior surface forming left and right openings. The left and right openings are each configured to receive one of the plurality of connectors used to connect the first and second nut halves. Sometimes a portion of the left and right penetrations near the left and right openings is countersunk. In certain embodiments, the left and right penetrations of the first interior surface extend through the first exterior surface and the left and right penetrations of the second interior surface extend through the second exterior surface.

In an alternative embodiment, a split nut is provided for use in fitting around an exposed portion of anchor bolt that has been inserted through a support platform and into a concrete foundation of a support structure where the exposed portion is located between the foundation and the support platform. The split nut includes a first nut half and a second half nut. The first nut half includes a first exterior surface, first flats formed on the first exterior surface, a first interior surface, a first threaded half cylinder formed on the first interior surface, left and right joining surfaces formed on the first interior surface, and left and right penetrations extending through the left and right joining surfaces. The second half nut includes a second exterior surface, second flats formed on the second exterior surface, a second interior surface, and a second threaded half cylinder formed on the second interior surface.

Additionally, left and right joining surfaces formed on the second interior surface are configured to align with the joining surfaces of the first half nut. Left and right penetrations extending through the left and right joining surfaces of the second half nut are configured to align with the left and right penetrations of the first half nut when the joining surfaces of the first and second half nuts are aligned. The left and right penetrations extend through at least one of the first exterior surface and the second exterior surface. Left and right connectors are dimensioned to fit through the left and right penetrations and are configured to secure the first and second half nuts together. The first and second threaded cylinders are configured to form an opening having a cooperative thread system when the first and second half nuts are secured together by the left and right connectors. Also, the first and second flats are dimensioned to form opposed parallel drive surfaces when the first and second half nuts are secured together.

In certain embodiments, the first and second flats form a hexagonal exterior surface when the first nut half contacts the second nut half. Sometimes the left and right penetrations of the first and second nut halves extend through the respective exterior surface. In certain embodiments, a portion of the left and right penetrations of at least one of the first nut half and the second nut half is countersunk.

The following disclosure also provides a method for adding supplemental anchor bolts to existing support structures. The method includes providing an existing support structure having a support platform and a foundation, providing a supplemental hole in the support platform that is sized and configured to receive a supplemental threaded anchor bolt, and providing a supplemental hole in the foundation that is in alignment with the supplemental hole in the support platform. A supplemental threaded anchor bolt is inserted through the supplemental holes in the support platform and foundation such that the anchor bolt extends away from the foundation and through the supplemental hole in the support platform. A threaded nut is threaded on the supplemental threaded bolt above the top surface of the support platform. A first threaded half nut is positioned on a first side of the supplemental threaded bolt between the bottom surface of the support platform and the foundation, Then, a second threaded half nut is positioned on a second side of the supplemental threaded bolt between the bottom surface of the support platform and the foundation and opposite from and in alignment with the first half nut. A split nut is then formed by securing together the first and second nut members with a connection member such that threads of the half nuts are meshed with threads of the bolt. Then the split nut is turned about the supplemental threaded bolt such that it engages the bottom surface of the support platform. Sometimes, the method also includes providing a supplemental foundation proximate the foundation of the existing support and attaching a supplemental support platform to the support platform of the existing support. The supplemental holes are provided in the supplemental foundation and supplemental support platform.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
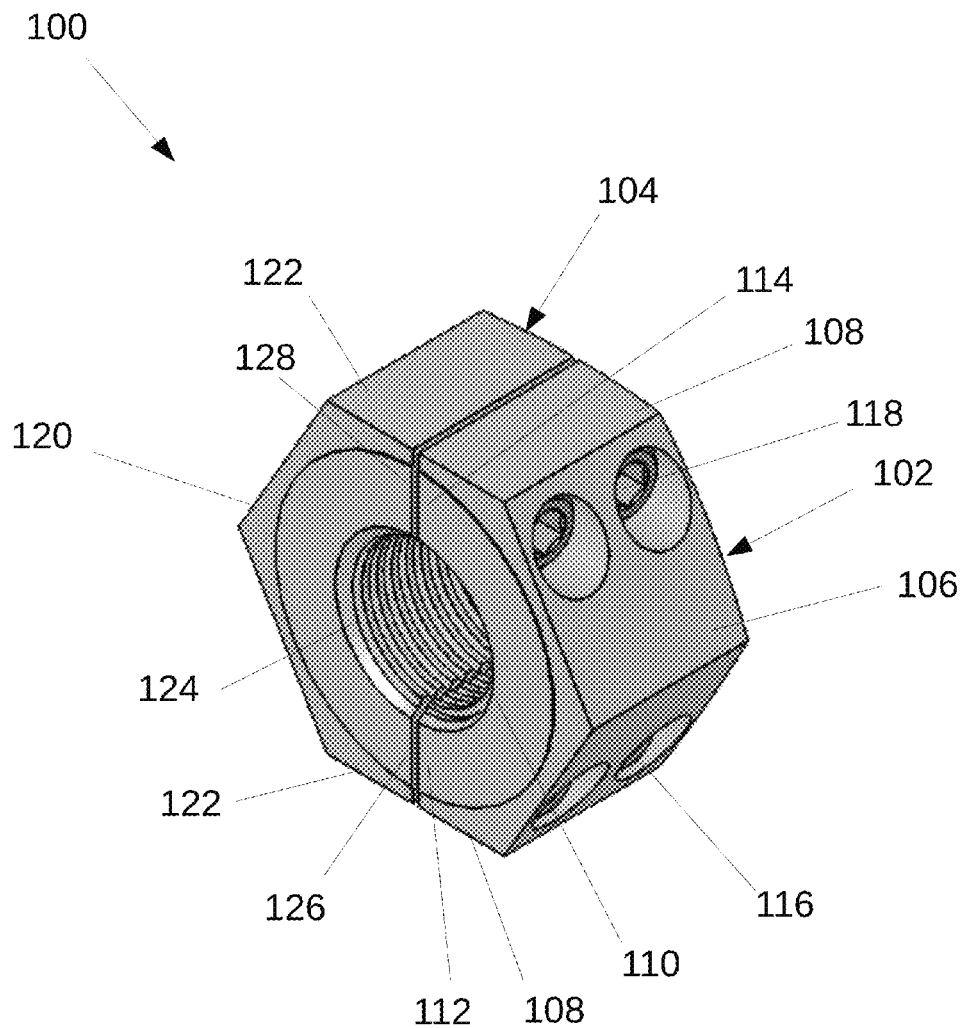
FIG. 1 is a side perspective view depicting a split nut according to an embodiment of the present invention.

In the description that follows and accompanying drawings, like or corresponding parts are marked throughout the specification and drawings with the same reference numerals. The drawings are not necessarily to scale and the proportions of certain parts may have been exaggerated and/or shown in schematic form in the interest of clarity and conciseness.

In general, the split nut of the present invention includes two half nuts that are first clamped around the either side of the threaded anchor, secured together to form a single nut, and then threaded into place to secure the new support platform. Referring now to FIG. 1, there is provided a side perspective view of a split nut 100 according to one embodiment of the present invention. In this particular view, the split nut 100 is shown in a vertical orientation with a first half nut 102 shown on the right and a second half nut 104 spaced slightly apart on the left.

The first nut half 102 includes a first exterior surface 106 having first flats 108 formed thereon. Similarly, the second nut half 104 includes a second exterior surface 120 having second flats 122 formed thereon. When the nut halves 102, 104 are placed alongside one another, these flats 108, 122 are dimensioned to be engaged by a wrench for screwing the split nut 100 onto a bolt as will be hereinafter described. It will be appreciated that the precise dimensions of the flats will vary according to circumstances.

Figure 2:
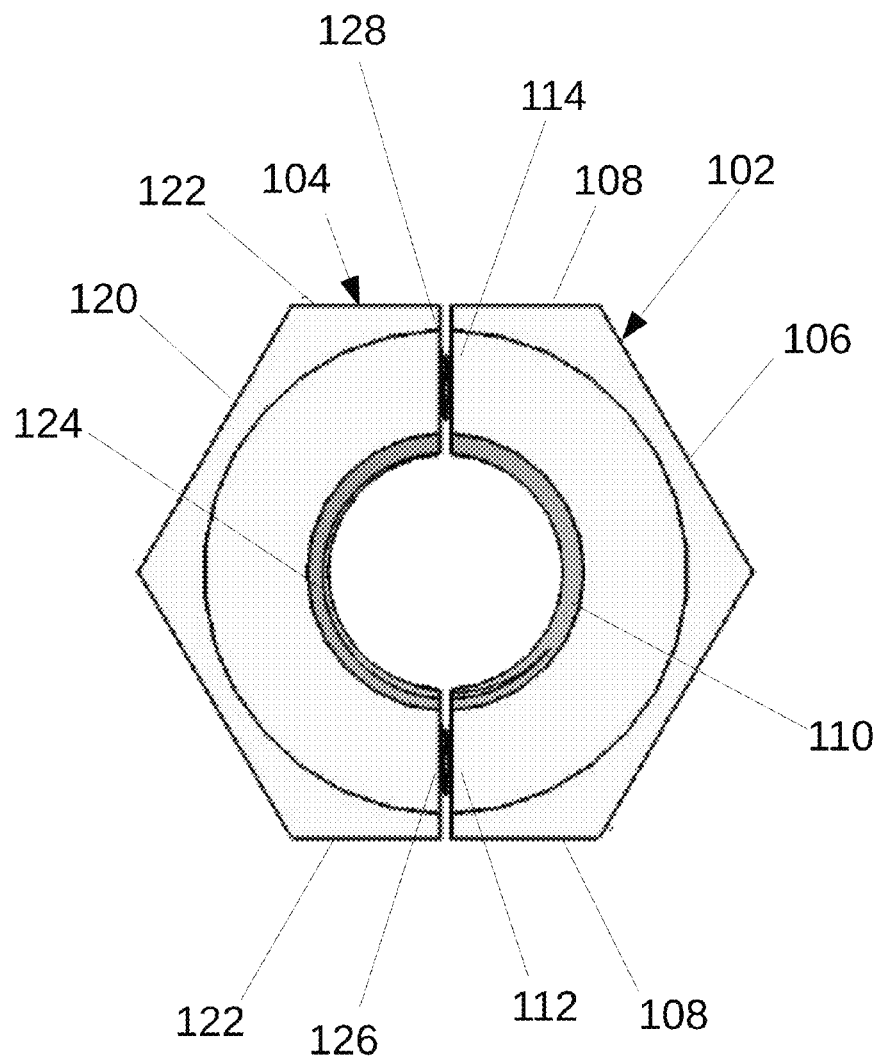
FIG. 2 is a front elevation view of the split nut shown in FIG. 1.

In the front elevation view of the split nut 100 which is shown in FIG. 2, interior surfaces of each half nut 102, 104 are shown. The interior surface of the first half nut 102 includes a first threaded half cylinder 110, a left joining surface 112, and a right joining surface 114. Likewise, the interior surface of the second half nut 104 includes a second threaded half cylinder 124, a left joining surface 126, and a right joining surface 128. When the two half nuts 102, 104 are placed in side-by-side relation, the left joining surfaces 112, 126 are joined and the right joining surfaces 114, 128 are joined in face-to-face relation with one another. In this orientation, the first and second threaded half cylinders 110, 124 are also in face-to-face relation and form a threaded opening having a cooperative thread system with threads configured to receive an anchor bolt.

Figure 3:
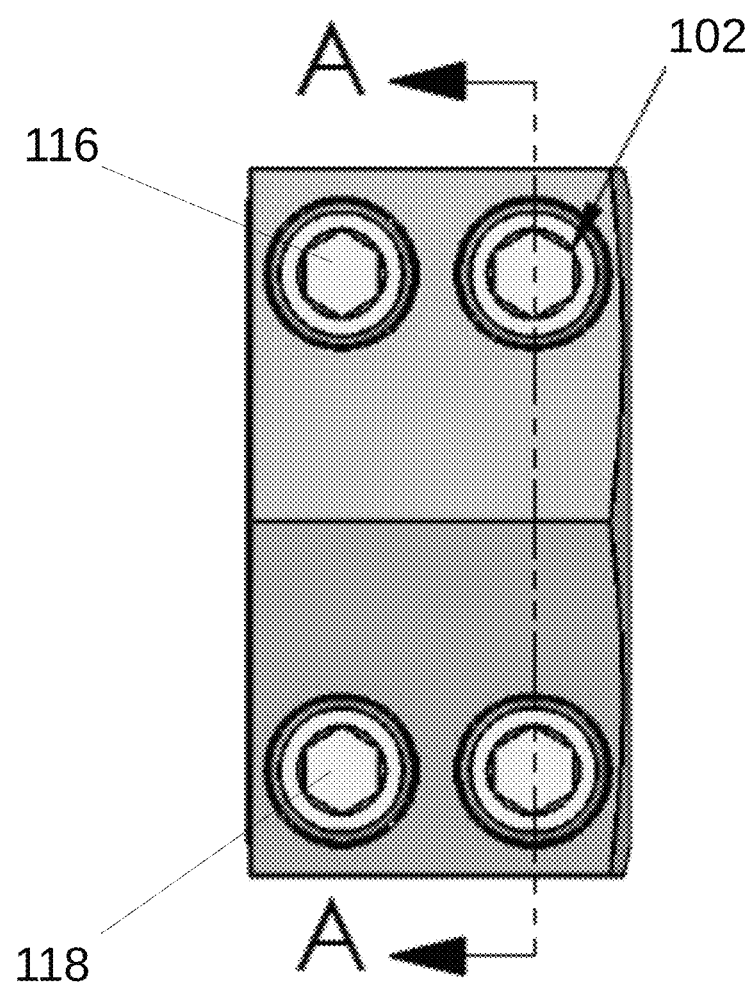
FIG. 3 is a right side view of the split nut shown in FIG. 1.
Figure 4:
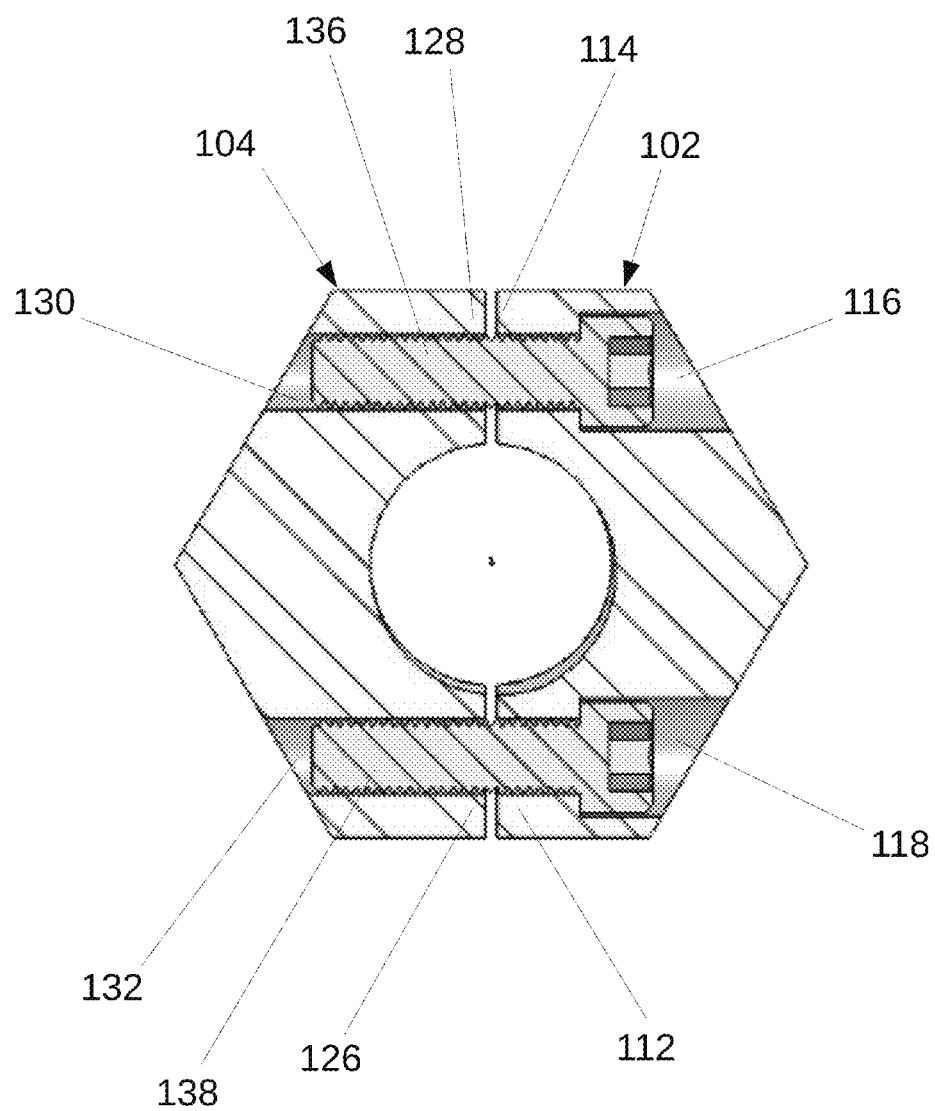
FIG. 4 is cross-sectional view of the split nut taken through section line A-A shown in FIG. 3.
Figure 5:
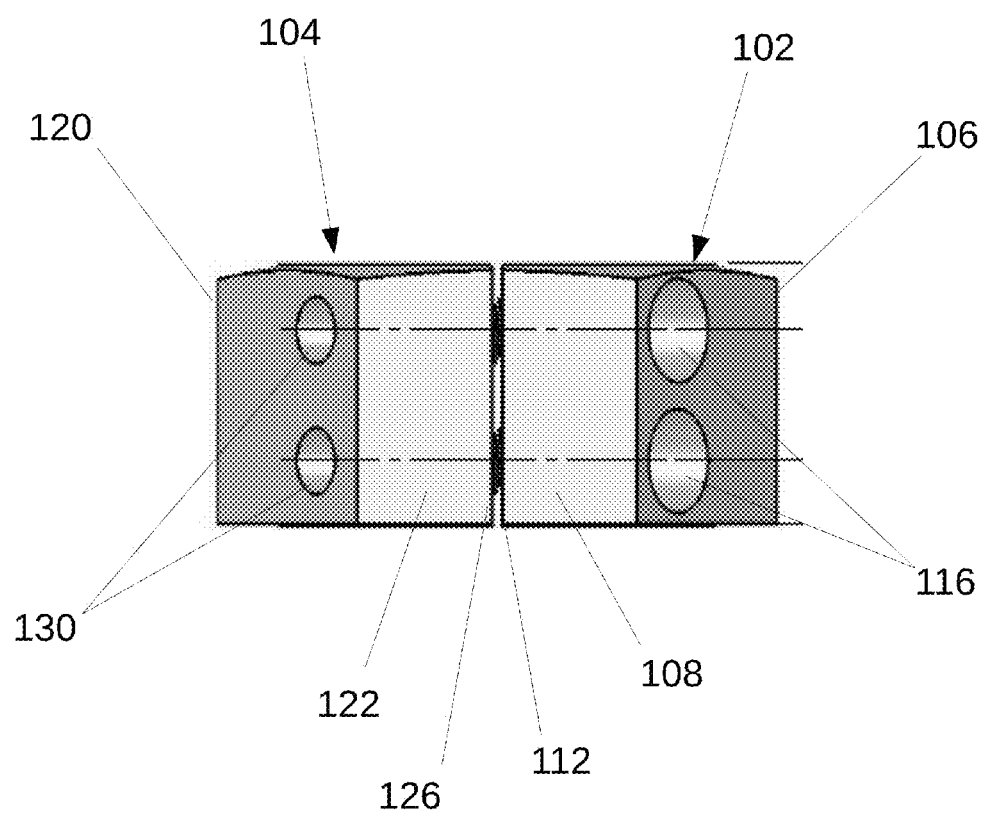
FIG. 5 is a bottom elevation view of the split nut shown in FIG. 1.
Figure 6:
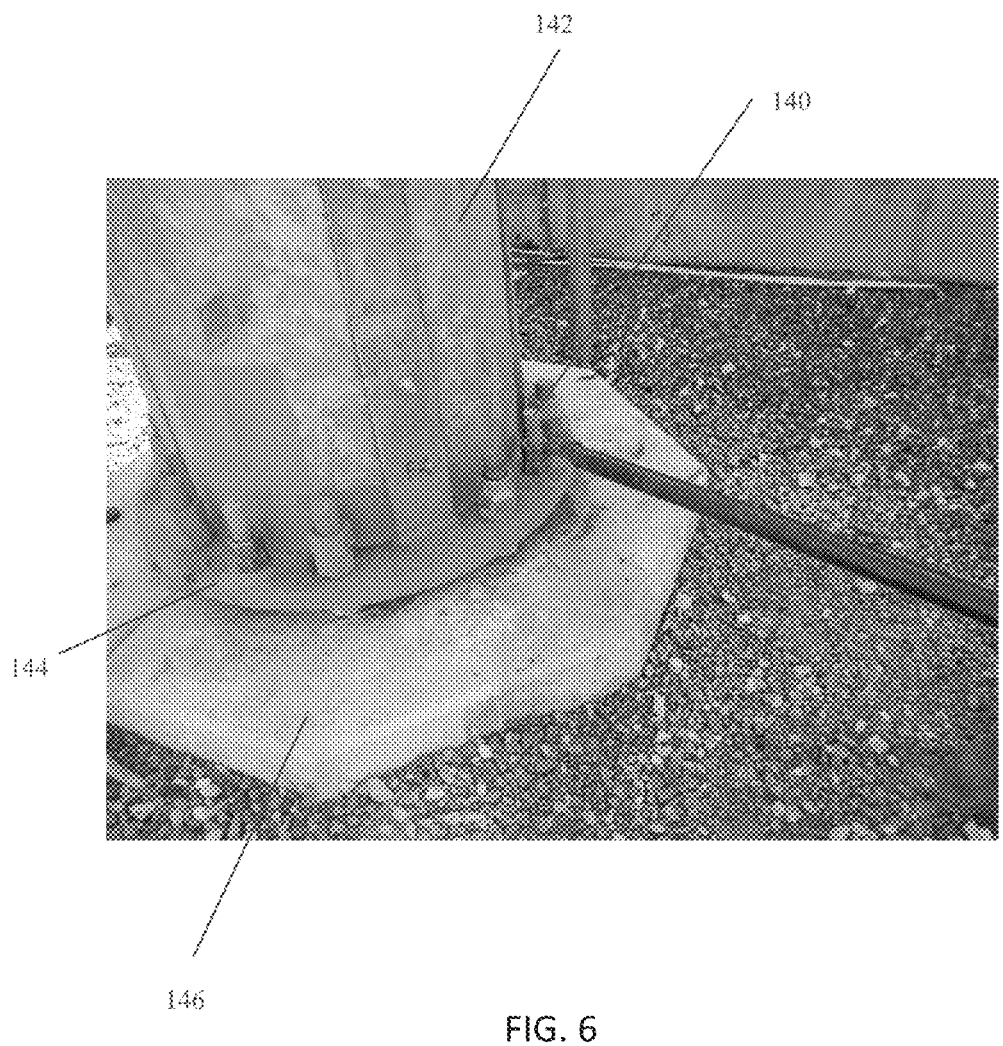
FIG. 6 illustrates a support structure having a support platform and foundation having supplemental bolts installed.
Figure 7:
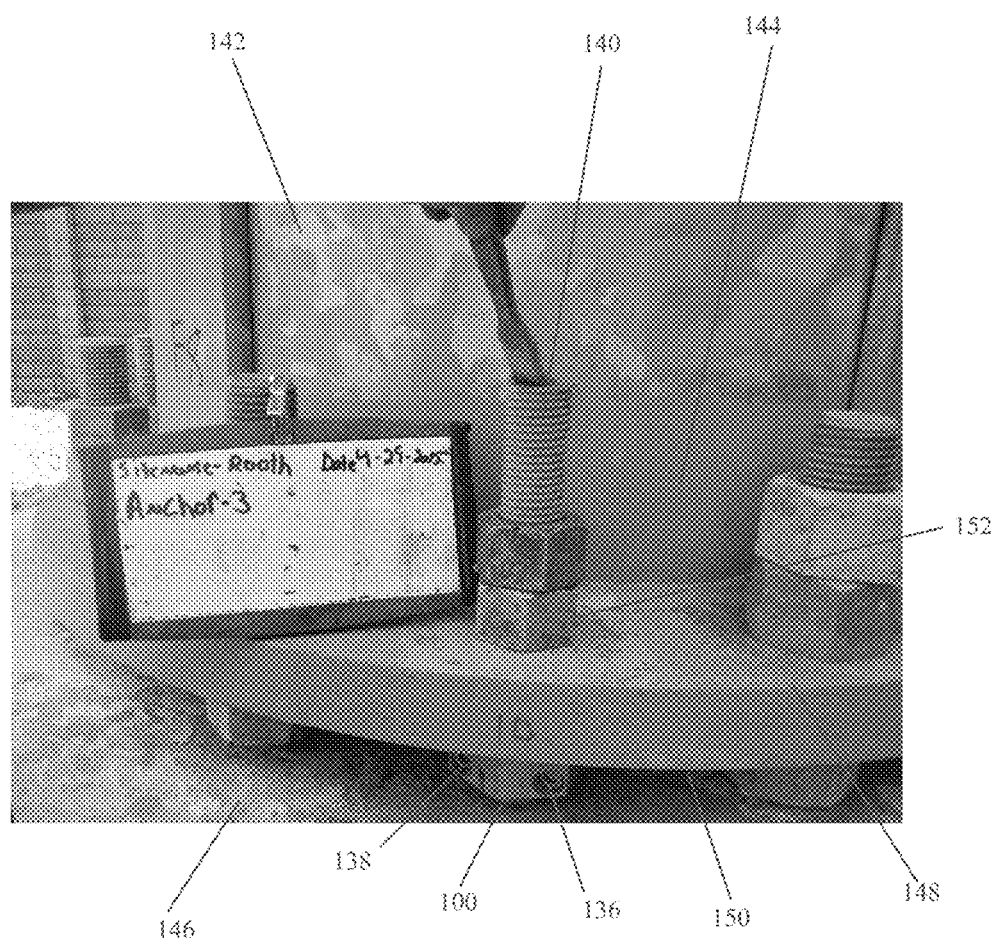
FIG. 7 is close view of a supplemental bolt installed on the support structure in FIG. 6.

FIG. 3 is a side view depicting the first nut half 102 and FIG. 4 is a sectional view shown along line A-A. In FIG. 4, it may be seen that at least one left penetration 118 and at least one right penetration 116 may be formed in left and right sides of the first half nut 102 and extend through the left and right joining surfaces 112, 114, respectively. Similarly, at least one corresponding left penetration 132 and at least one right penetration 130 may also be formed in left and right sides of the second half nut 104 and also extend through the left and right joining surfaces 126, 128, respectively. FIG. 5 is an elevation that depicts a bottom surface of the split nut 100. As shown in FIGS. 4 and 5 it may be seen that the left and right penetrations 132, 130 of the second half nut 104 are configured to align with the left and right penetrations 118, 116 of the first half nut 102 when the joining surfaces 112, 114 of the first half nut and aligned with the joining surfaces 126, 128 of the second half nut.

At least one of the left penetrations 118, 132 also extend through the exterior surface 106, 120 of the first or second half nut 102, 104. Similarly, at least one of the right penetrations 116, 130 also extend through the exterior surface 106, 120 of the first or second half nut 102, 104. As shown in FIG. 4, all penetrations extend through the corresponding exterior surface.

It may be appreciated from the discussion above and from FIG. 4 that one purpose of the penetrations is to receive a connector to connect the two half nuts together. In particular, when the half nuts 102, 104 are positioned next to one another, a left connector 138 may be inserted through the aligned left penetrations 118, 132, and a right connector 136 may be inserted through the aligned right penetrations 116, 130. The connector and penetrations may have corresponding threads to provide for a threaded connection. It may be appreciated that other types of connectors may be used, such as rivets.

When the two nut halves 102, 104 are mated or placed in close proximity to one another, left and right connectors may be inserted through the left and right penetrations of both half nuts to secure the first and second half nuts together to form the threaded opening discussed above.

As briefly mentioned earlier, in the process of reinforcing support towers, it is often necessary to also reinforce the foundation structure to accommodate additional weight from added equipment. One technique for reinforcing the foundation is to drill one or more additional holes through the platform at the bottom of the tower and into the concrete foundation. A bolt is inserted through each of the holes in the platform and through the holes in the concrete foundation. The bolts are designed to be screwed into the concrete foundation and secured in the foundation using conventional techniques. Nuts above and below the support platform are then threaded along the anchor bolt to contact and support the support platform.

Alternatively, additional concrete foundation may be poured around the original cell phone tower foundation. Then, addition support platform sections are connected to the existing support platform. For example, a support platform plate may be welded end-to-end to the original support platform. After the new plate has been secured to the old platform, a hole is bored through the new plate and through the new concrete foundation. An anchor bolt is inserted through the plate and into the foundation. Nuts above and below the support platform are then threaded along the anchor bolt to contact and support the support platform.

In both of these cases, securing the lower surface of the support plate with a standard nut is difficult or impossible due to the lack of space between the support platform and the foundation or the inability to thread a nut onto the threaded bolt. The only way to thread a conventional nut onto this lower portion of the threaded anchor bolt is to do so before the anchor bolt is secured in the concrete foundation. This may be an option in certain cases, but may not be feasible in others. In those cases, it is far easier to use a split bolt that may be clamped around the anchor bolt in the manner described below.

To secure the support platform to the foundation, a conventional nut may be threaded onto the portion of the threaded anchor above the support platform and is rotated until the nut contacts the platform. On the other hand, since there is no access for placing a conventional but on the bolt below the platform, a split nut must be used. The split nut is applied to the anchor bolt by first placing the first and second half nuts of the split nut around the bolt so that the penetrations of the first nut half are aligned with the penetrations of the second nut half. The threads in the half cylinders of both half nuts are meshed with the threads of the anchor bolt. While holding the two half nuts in place, connectors are then inserted into the penetrations and secured to connect the two half nuts together. The connectors may be screws that are threaded into threaded penetrations or they may be rivets.

After the two half nuts are connected together, the flats on either side of the half nuts are aligned to form a substantially flat surface that is dimensioned to form opposed parallel drive surfaces. These drive surfaces are configured to be engaged by a wrench for screwing thing split nut on the threaded anchor, which forces the split nut upwards until it engages the bottom surface of the support platform.

FIGS. 6-11 illustrate the installation process used for installing a split nut 100 onto a threaded bolt 140 in a support structure 142 having a support platform 144 and foundation 146. The support platform 144 includes a top surface 148 and a bottom surface 150 and is spaced apart from the foundation 146 such that there is a space provided between the platform and the foundation. The threaded bolt 140 is inserted through a hole in the support platform 144 and is inserted into another hole provided in the foundation 146 and secured therein. A portion of the bolt 140 extends away from the top surface 148 of the platform 144 and another portion of the bolt is exposed in the space between the platform and the foundation 146. To secure the support platform 144 to the bolt 140, a standard threaded nut 152 may be threaded onto the bolt 144 and rotated until it contacts the top surface 148 of the platform 144. The split nut 100 is then mounted onto the exposed portion of the bolt 140 that is located between the bottom surface 150 of the platform 144 and the foundation 146. These steps are shown best in FIGS. 8-11 and are detailed below. Once the split nut 100 has been mounted to the bolt 140, it may be rotated until it contacts the bottom surface 150 of the platform 144.

Figures 8, 9:
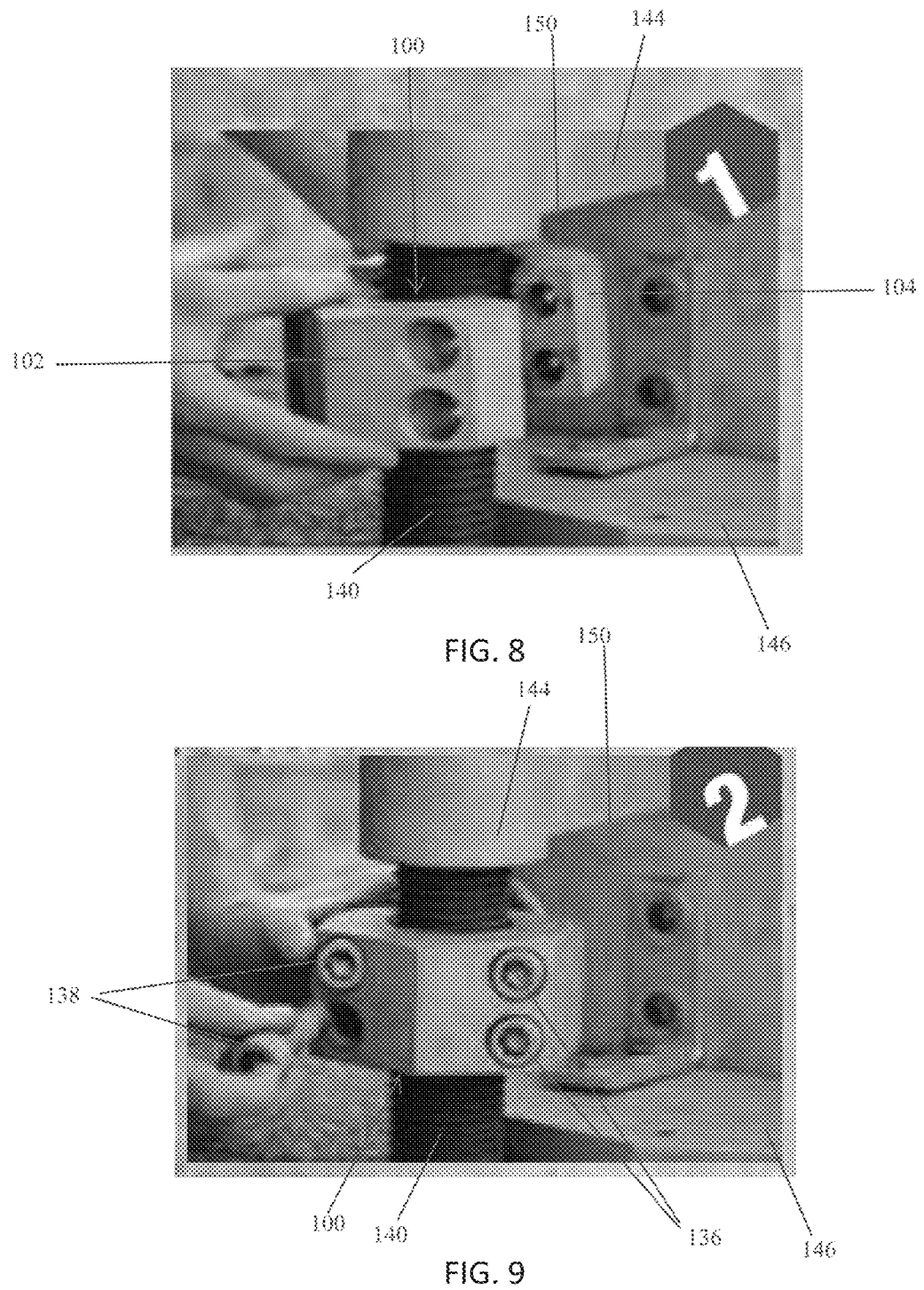
FIG. 8 illustrates the step of placing two half nuts around opposite sides of an exposed portion of a bolt.
FIG. 9 illustrates the step of inserting connectors into openings and through the first and second half nuts.
Figure 10:
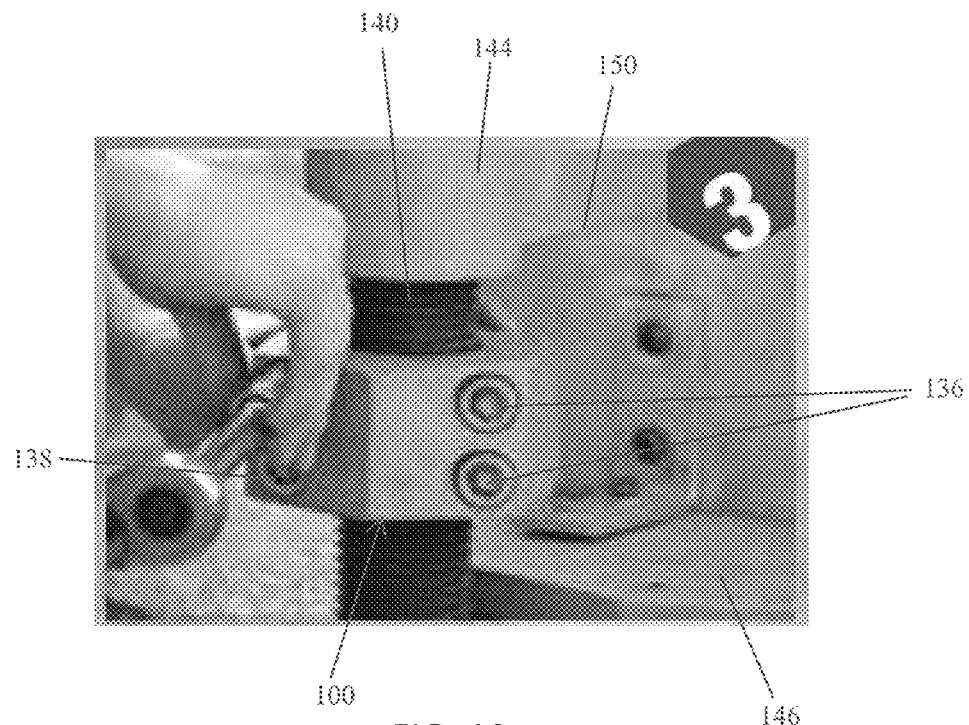
FIG. 10 illustrates the step of securing the first and second half nuts together by threading the connectors into the penetrations.
Figure 11:
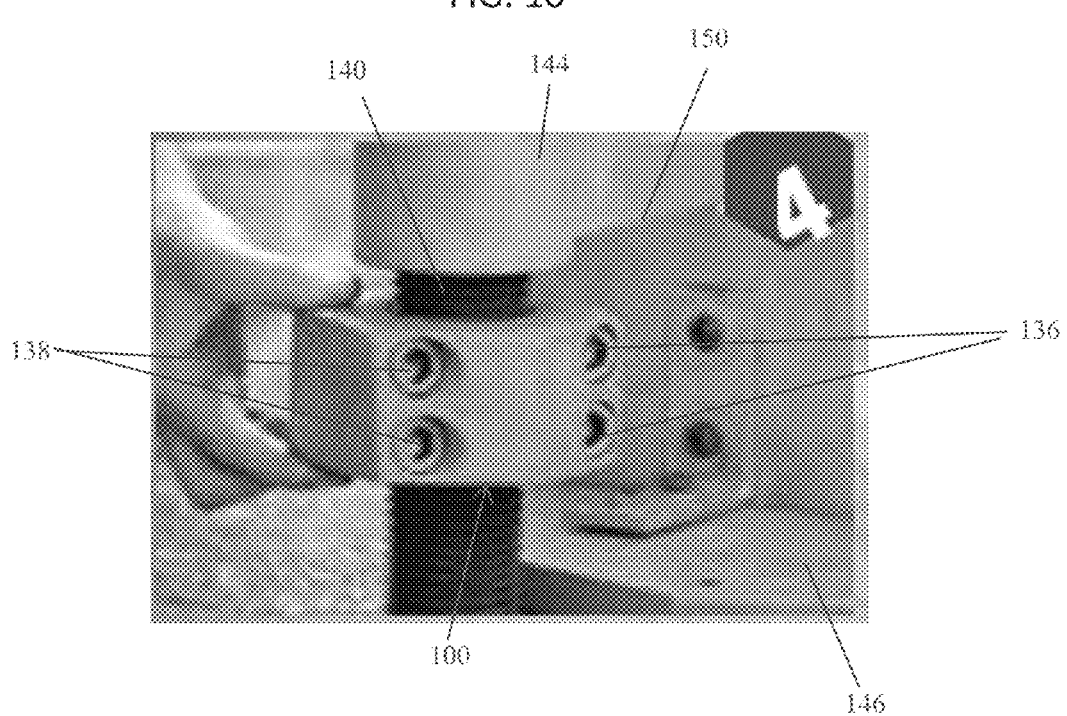
FIG. 11 illustrates the step of rotating the split nut about the exposed portion of the anchor bolt in order to secure it against a bottom surface of the support platform.

FIG. 8 illustrates a first step is mounting a split nut 100 to a threaded bolt 140. In particular, the first and second nut halves 102, 104 are placed on opposing sides of the threaded bolt 140. In particular, the split nut halves 102, 104 are placed on the exposed portion of the bolt 140 that is located below the bottom surface 150 of the support 144 above the foundation 146. The nut halves 102, 104 are positioned so that the left and right penetrations are aligned and so that the threads in the threaded half cylinders are meshed with the threads of the bolt 140. As shown in FIG. 9, threaded connectors 136, 138 are then inserted into the penetrations via openings in the exterior surface of one of the half nuts. Once the half nuts 102, 104 are connected together, connectors 136, 138 are threaded into the penetrations in order to connect the first nut to the second nut. The nut halves 102, 104 include flats which are used to turn the split nut 100 on the bolt 140. In certain embodiments, the flats form a hexagonal outer surface to facilitate tightening the nut 100 with a wrench.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A split nut for use in fitting around an exposed portion of a threaded bolt where an end of the bolt is inaccessible, the split nut comprising:
   a. a first nut half having:
      i. a threaded half cylinder formed on a first interior surface;
      ii. a first exterior surface;
      iii. a plurality of flats formed on the first exterior surface;
   b. a second half nut configured to contact the first nut half, the second nut half having:
      i. a threaded half cylinder formed on a second interior surface;
      ii. a second exterior surface;
      iii. a plurality of flats formed on the second exterior surface;
   c. a plurality of connectors for removably connecting the first nut half to the second nut half;
   d. the first and second threaded half cylinders being configured to form an opening having a cooperative thread system when the first and second half nuts are secured together by the plurality of connectors, the first half nut and second half nut and the plurality of connectors being configured and dimensioned to fit around the bolt with the threads of the half cylinders engaging the threads of the bolt;
   e. the plurality of flats on the first and second nut halves being dimensioned to form opposed parallel drive surfaces when the first and second half nuts are secured together.

2. The split nut of claim 1 wherein the first and second exterior surfaces form a hexagonal outer surface when the first nut half contacts the second nut half.

3. The split nut of claim 1 further comprising:
   left and right joining surfaces formed on the first interior surface;
   left and right joining surfaces formed on the second interior surface and configured to align with the joining surfaces of the first half nut; and
   left and right penetrations extending through the left and right joining surfaces of the first interior surface configured to align with left and right penetrations extending through the left and right joining surfaces of the second interior surface when the joining surfaces of the first and second half nuts are aligned;
   wherein the left and right penetrations in at least one of the first and second interior surfaces extends through the corresponding exterior surface forming left and right openings, each configured to receive one of the plurality of connectors.

4. The split nut of claim 3 wherein a portion of the left and right penetrations proximate the left and right openings is countersunk.

5. The split nut of claim 3 wherein the left and right penetrations of the first interior surface extends through the first exterior surface and wherein the left and right penetrations of the second interior surface extends through the second exterior surface.

6. An apparatus comprising:
   a foundation;
   a support platform disposed above the foundation;
   a threaded bolt anchored in the foundation and extended upwardly through a hole formed in the support platform, the threaded bolt having an exposed threaded portion located between the foundation and the support platform;
   a split nut having:
      a first nut half having:
         a first exterior surface;
         first flats formed on the first exterior surface;
         a first interior surface;
         a first threaded half cylinder formed on the first interior surface;
         left and right joining surfaces formed on the first interior surface;
         left and right penetrations extending through the left and right joining surfaces;
      a second half nut having:
         a second exterior surface;
         second flats formed on the second exterior surface;
         a second interior surface;
         a second threaded half cylinder formed on the second interior surface;
         left and right joining surfaces formed on the second interior surface and configured to align with the joining surfaces of the first half nut; and
         left and right penetrations extending through the left and right joining surfaces and configured to align with the left and right penetrations of the first half nut when the joining surfaces of the first and second half nuts are aligned;
      the left and right penetrations extending through at least one of the first exterior surface and the second exterior surface;
      left and right connectors dimensioned to fit through the left and right penetrations and configured to secure the first and second half nuts together;
      the first and second threaded cylinders being configured to form an opening having a cooperative thread system threadably engaged with the exposed threaded portion of the bolt when the first and second half nuts are secured together by the left and right connectors around the bolt, the first and second half nuts and the left and right connectors being configured and dimensioned so that the connectors hold the cooperative thread system in a position that fits around the bolt with threads of the half nuts engaging threads of the bolt; and
      the first and second flats being dimensioned to form opposed parallel drive surfaces when the first and second half nuts are secured together.

7. The apparatus of claim 6 wherein the first and second flats form a hexagonal exterior surface when the first nut half contacts the second nut half.

8. The apparatus of claim 6 wherein the left and right penetrations of the first and second nut halves extend through the respective exterior surface.

9. The apparatus of claim 6 wherein a portion of the left and right penetrations of at least one of the first nut half and the second nut half is countersunk.

10. A method for adding supplemental anchor bolts to existing support structures, the method comprising the steps of:
   providing an existing support structure having a support platform and a foundation;
   providing a supplemental hole in the support platform that is sized and configured to receive a supplemental threaded anchor bolt;

providing a supplemental hole in the foundation that is in alignment with the supplemental hole in the support platform;

inserting a supplemental threaded anchor bolt through the supplemental holes in the support platform and foundation such that the anchor bolt extends away from the foundation and through the supplemental hole in the support platform;

threading a threaded nut on the supplemental threaded bolt above the top surface of the support platform;

positioning a first threaded half nut on a first side of the supplemental threaded bolt between the bottom surface of the support platform and the foundation;

positioning a second threaded half nut on a second side of the supplemental threaded bolt between the bottom surface of the support platform and the foundation and opposite from and in alignment with the first half nut;

forming a split nut by securing together the first and second nut members with a connection member such that threads of the half nuts are meshed with threads of the bolt;

turning the split nut about the supplemental threaded bolt such that it engages the bottom surface of the support platform.

11. The method of claim 10 further comprising:

providing a supplemental foundation proximate the foundation of the existing support;

attaching a supplemental support platform to the support platform of the existing support;

wherein the supplemental holes are provided in the supplemental foundation and supplemental support platform.

* * * * *